Jan. 30, 1962 R. E. MEYER 3,018,620
THRUST REVERSER TAILORING TABS
Filed May 22, 1959
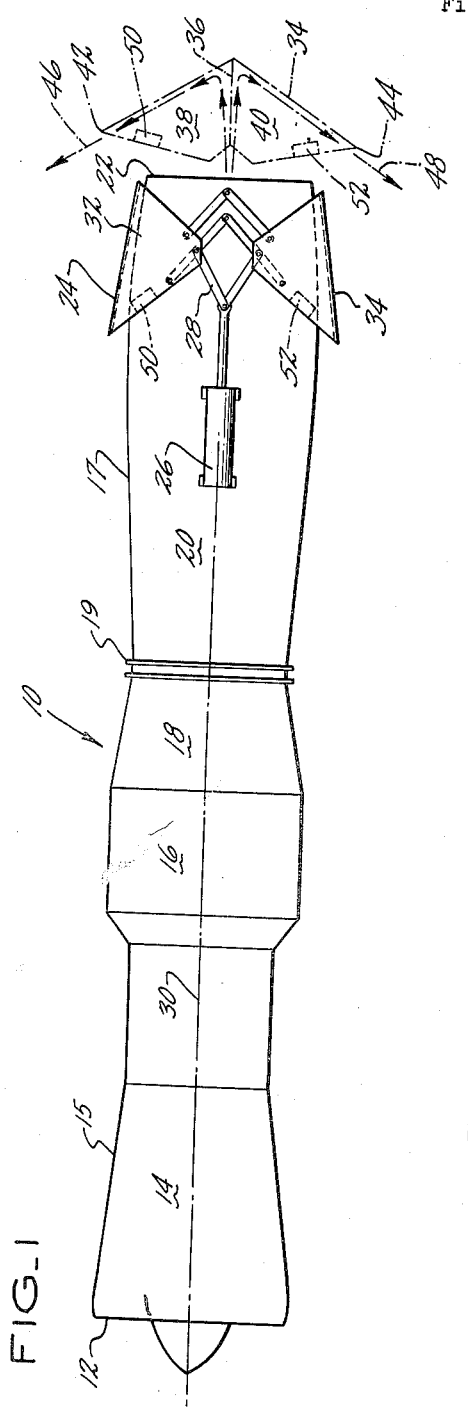
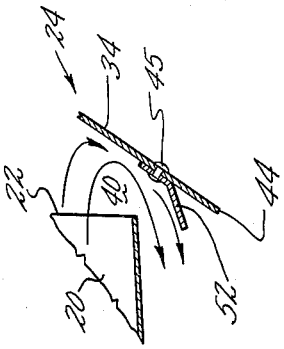
FIG. 3
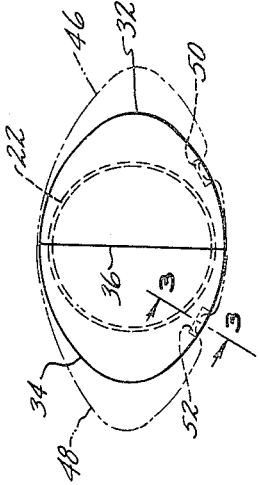
FIG. 2
FIG. 1
INVENTOR
ROBERT E. MEYER
BY Vernon F. Hauschild
ATTORNEY

United States Patent Office 3,018,620
Patented Jan. 30, 1962

3,018,620
THRUST REVERSER TAILORING TABS
Robert E. Meyer, Jupiter, Fla., assignor to United Aircraft Corporation, East Hartford, Conn., a corporation of Delaware
Filed May 22, 1959, Ser. No. 815,071
1 Claim. (Cl. 60—35.54)

This invention relates to the reversal of thrust on jet propulsion type engines and more particularly to the control of the pattern of the redirected jet.

It was found early in aircraft jet engine experience that the high landing speed of aircraft powered by jet propulsion engines was so high that they could not effectively be stopped upon landing by wheel brakes. Further, since there was no propeller which could be reversed to effect airplane braking upon landing, it was found necessary to devise means to reverse the direction of the propulsive jet formed by discharging engine exhaust gases to atmosphere. Thrust reversers which intercepted and redirected the flow of engine exhaust gases were devised to accomplish this jet engine braking function.

It has further been found that while thrust reversers are an effective method of braking a jet propulsion engine, there are problems brought about by the redirecting of the exhaust gases by the thrust reverser which must be solved. For example, it is injurious to the aircraft and its accessories such as the airplane fuselage, radar domes, and the engine accessories which would be deleteriously affected by the impinging of the hot exhaust gases thereagainst. Further, engine operation is hampered if the heated exhaust gases are reingested into an engine and if the runway debris which is "kicked up" by the redirected exhaust gases is reingested into an engine. These particular problems associated with thrust reversers differ depending upon the engine on which the thrust reverser is used and the airplane in which the engine is used. For example, the engine and airframe accessories may be located at different places while the height of the engine from the runway alters the runway debris problem and plural engine airplanes present cross-ingestion problems not encountered in single engine airplanes. In view of the variations of these thrust reverser problems just enumerated, it has been impossible to design an effective thrust reverser suitable for all engine and airplane installations, in fact, expensive and time-consuming permanent "tailoring" of the basic thrust reverser was found to be necessary to adapt it for use on more than one engine or airplane.

It is an object of this invention to provide means for tailoring a basic thrust reverser such that it may be used on an indefinite number of engines and airplanes and which tailoring means is temporary, inexpensive and operably effective.

Other objects and advantages will be apparent from the specification and claim, and from the accompanying drawings which illustrate an embodiment of the invention.

FIG. 1 is a top plan view of a jet propulsion type aircraft engine showing the thrust reverser, including my temporary tailoring means, in both its retracted and operable positions.

FIG. 2 is a rear elevation with the thrust reverser in its operable position and illustrating in phantom the periphery of the redirected gas pattern together with the effect which my temporary tailoring means has thereupon.

FIG. 3 is a view taken along line 3—3 of FIG. 2.

Referring to FIG. 1 we see modern aircraft jet propulsion engine 10 comprising air inlet 12, compressor section 14, burner section 16, turbine section 18, afterburner 20 culminating in engine exhaust outlet 22, and with thrust reverser unit 24. Air enters engine 10 through inlet 12, is compressed in passing through compressor 14, is heated in passing through burner section 16, has energy extracted therefrom to drive compressor 14 in passing through turbine 18, is reheated in passing through afterburner 20, and is discharged to atmosphere through circular exhaust outlet 22, with thrust reverser 24 in its retracted, solid line FIG. 1 position, to produce a propulsive jet of exhaust gases. Engine 10 may be of the type fully disclosed in U.S. Patent No. 2,747,367 while afterburner 20 may be of the type fully disclosed in U.S. Patent No. 2,863,282. Engine case 15 and afterburner duct 17 are joined by connecting means 19 and are of circular cross section and concentric about axis 30.

With thrust reverser 24 in its retracted, solid line FIG. 1 position, engine 10 will generate positive, forward thrust. During airplane landing operation, for example, it is desirable for airplane braking purposes to develop a reverse thrust. This may be accomplished by causing thrust reverser 24 to move and preferably pivot to its FIG. 1 phantom position by the cooperation of hydraulic cylinder-piston unit 26 and linkage means 28. It will be noted that thrust reverser 24 is axisymmetric about engine axis 30 and includes two half-duct units 32 and 34 which are pivotable by actuator 26 and linkage 28 to a retracted position wherein, as best shown in solid lines in FIG. 1, units 32 and 34 are positioned adjacent and substantially radially outboard of engine exhaust outlet 22. When actuated to their operable positions by actuator 26 and linkage 28, half-duct units 32 and 34 abut along line 36 to form two symmetric exhaust gas redirecting paths indicated generally at 38 and 40. Duct means 32 and 34 have downstream edges 42 and 44 when in their operable position which establishes the contour of the periphery, generally indicated by arrows at 46 and 48 in FIG. 1 and by dotted lines in FIG. 2, of the exhaust gas pattern 38 and 40 established by thrust reverser 24.

Experience has shown that when thrust reversers are fabricated to provide optimum reverse thrust and hence braking, the pattern of redirected exhaust gas may impinge against engine or airframe accessories or cause the reingestion problems discussed supra. Accordingly, it has been found necessary to "tailor" the periphery of the redirected exhaust gas pattern to divert it toward engine axis 30 and hence away from the fragile accessories and the like. To accomplish this necessary "tailoring" without permanently altering the basically sound thrust reverser, flow diverting flaps or tabs 50 and 52 are positioned along the downstream edges or ends 42 and 44 of thrust reverser 24 and are of such size, shape and number as to direct the reversed exhaust gases locally toward axis 30, as best shown in FIG. 3. Tabs 50 and 52 are attached to reverser 24 by any temporary connection such as screws 45. FIGS. 1 and 2 show flow diverting flaps 50 and 52 to be positioned toward the bottom of thrust reverser 24 to prevent runway debris "kick up" and its ingestion into the engine. Flaps 50 and 52 may be placed at any position along the periphery of downstream edges 42 and 44. The effect of flaps 50 and 52 upon the periphery 46 and 48 of the redirected exhaust gas pattern 38 and 40 is best shown in FIG. 2 wherein the periphery is shown to be bent by tabs 50 and 52 toward axis 30 and hence away from the runway.

It is to be understood that the invention is not limited to the specific embodiment herein illustrated and described but may be used in other ways without departure from its spirit as defined by the following claim.

I claim:

In combination, an engine having an outer case concentric about an axis and terminating in an exhaust outlet and which generates thrust by developing a propulsive exhaust gas jet which is discharged to atmosphere through said outlet, a thrust reverser comprising axisymmetric duct means attached to said case adjacent said outlet and including two half-duct units movable between a retracted position wherein said half-duct units are positioned adjacent said case and radially outboard and on opposite sides of said outlet and an operable position wherein said half-duct units abut downstream of said outlet to intercept said propulsive jet and redirect gas flow thereof into two axisymmetric forwardly directed paths defined by said half-duct units whereby reverse thrust is produced, said half-duct units having downstream edges when in said operable position shaped to establish the peripheral contour of said forwardly directed paths, and readily attachable and detachable flow diverting tabs attached to said half-duct units at selected positions along said downstream edges and positioned to locally intercept and locally alter the shape of said peripheral contour toward said axis.

References Cited in the file of this patent

UNITED STATES PATENTS

| | | |
|---|---|---|
| 2,510,506 | Lindhagen et al. | June 6, 1950 |
| 2,620,622 | Lundberg | Dec. 9, 1952 |
| 2,681,547 | MacDonald | June 22, 1954 |
| 2,839,891 | Drakeley | June 24, 1958 |
| 2,903,851 | Fiedler | Sept. 15, 1959 |
| 2,945,346 | Arnzen | July 19, 1960 |
| 2,950,595 | Laucher et al. | Aug. 30, 1960 |
| 2,960,822 | Bertin | Nov. 22, 1960 |

(Duplicate of French Patent 1,090,067)

| | | |
|---|---|---|
| 2,964,905 | Hewson et al. | Dec. 20, 1960 |

FOREIGN PATENTS

| | | |
|---|---|---|
| 1,090,067 | France | Oct. 13, 1954 |